United States Patent [19]

Murrell et al.

[11] Patent Number: 4,708,945
[45] Date of Patent: Nov. 24, 1987

[54] CATALYSTS COMPRISING SILICA SUPPORTED ON A BOEHMITE-LIKE SURFACE, THEIR PREPARATION AND USE

[75] Inventors: Lawrence L. Murrell, South Plainfield; Nicholas C. Dispenziere, Jr., Wall, both of N.J.

[73] Assignee: Exxon Research and Engineering Company, Florham Park, N.J.

[21] Appl. No.: 815,220

[22] Filed: Dec. 31, 1985

[51] Int. Cl.$^4$ .............................................. B01J 21/12
[52] U.S. Cl. .................................... 502/263; 502/355; 502/439; 502/527; 423/335; 423/625
[58] Field of Search ............... 502/263, 355, 527, 439; 423/335, 625

[56] References Cited

U.S. PATENT DOCUMENTS

| | | | |
|---|---|---|---|
| 3,242,069 | 3/1966 | Cladrow et al. | 502/263 |
| 3,257,310 | 6/1966 | Plank et al. | 502/263 |
| 3,662,002 | 5/1972 | Magerlein et al. | 502/263 |
| 3,819,651 | 6/1974 | Worbs et al. | 502/263 |
| 3,898,182 | 8/1975 | Brown et al. | 502/263 |
| 3,943,064 | 3/1976 | Ballain et al. | 502/439 |
| 3,994,740 | 11/1976 | Morton | 501/128 |
| 4,013,589 | 3/1977 | Buonomo et al. | 502/263 |
| 4,337,366 | 6/1982 | Fattore et al. | 502/263 |
| 4,376,036 | 3/1983 | Garwood et al. | 288/111 |
| 4,392,988 | 7/1983 | Dobson et al. | 502/263 |
| 4,442,223 | 4/1984 | Chester et al. | 502/80 |

Primary Examiner—Andrew Metz
Assistant Examiner—Anthony McFarlane
Attorney, Agent, or Firm—Edward M. Corcoran; Joseph J. Dvorak

[57] ABSTRACT

Useful cracking catalysts and catalyst supports comprising silica supported on a boehmite-like surface are prepared by compositing particles of silica or hydrated silica with particles of porous boehmite and subjecting the resulting composite to high temperature steaming at a temperature of at least about 600° C. for a time sufficient to disperse at least a portion of the silica over the boehmite surface as the boehmite converts to $\gamma$-Al$_2$O$_3$. The silica wets, spreads out and reacts with the surface hydroxyl groups of the transforming boehmite.

7 Claims, No Drawings

CATALYSTS COMPRISING SILICA SUPPORTED ON A BOEHMITE-LIKE SURFACE, THEIR PREPARATION AND USE

BACKGROUND OF THE INVENTION

1. Field of the Invention

This invention relates to catalysts and catalyst supports comprising silica supported a boehmite like surface, their preparation and use. More particularly, this invention relates to cracking catalysts and catalyst supports comprising silica supported on a boehmite like surface which are prepared by compositing particles of silica or hydrated silica with particles of boehmite or pseudo-boehmite and subjecting said composite to high temperature steaming at a temperature of at least about 600° C. for a time sufficient for at least a portion of said silica to disperse over and react with the surface of the boehmite as it converts to gamma alumina.

2. Background of the Disclosure

The use of silica-alumina composites as catalysts and as catalyst support materials is well known to those skilled in the art. These catalysts are prepared in many different ways such as co-precipitation, various co-gel techniques, by contacting alumina with various silica precursor salts such as organosilanes, including alkoxy silanes followed by calcination of the so-formed composite to produce the desired silica-alumina material. Use of the latter techniques enables one to obtain an alumina whose surface is partly or completely covered with silica as opposed to a homogeneous or heterogeneous silicaalumina composite.

U.S. Pat. No. 4,440,872 to Grenoble et al discloses various acid cracking catalysts. Some of the catalyst supports are prepared by impregnating gamma alumina with a silane compound followed by either calcining or steaming the impregnate at 500° C. The calcined support material is then impregnated with ammonium meta-tungstate which is steamed at high temperature to form a catalyst. Peters et al in U.S. Pat. 3,671,432 disclose a process for preparing a supported transition metal of Group V or VI of the Periodic Table which includes mixing a water dispersible transition metal compound with particles of support material and calcining the mixture at a temperature of from 200°-1000° C. However, the disclosure contains examples employing only either chromium trioxide or vanadium pentoxide as the water dispersible transition metal compounds. U.S. Pat. No. 3,668,151 mixes particulate zinc oxide with particulate gamma alumina and calcines the mixture at 600°-1500° C. Browning et al in Pat. No. 3,182,012 prepare a cracking catalyst comprising cobalt and molybdenum on a silica-alumina support. The silica and alumina may be mixed as dry powders, but the cobalt and molybdenum are deposited on the support by impregnation. The final impregnate is calcined at 600°-1200° F.

In U.S. Pat. No. 2,830,960 Broomhead mixes cobalt formate, molybdic acid and an alumina hydrogel, followed by drying and calcining the mixture at 450°-650° C. Porter et al in U.S. Pat. No. 2,640,802 disclose mixing powdered cobalt oxide, molbdic oxide and alumina, pelleting the mixture and heating the pellets for two hours at 530° C. U.S. Pat. No. 3,151,091 discloses preparing alumina based catalyst by dry mixing alumina with an oxide of a metal selected from the group consisting of the iron transition metals, molybdenum, tungsten, vanadium and mixtures thereof and calcining the resulting mixture at 800°-1200° F.

U.S. Pat. No. 2,394,796 discloses impregnating a porous, hydrated alumina, including boehmite, with silicon tetrachloride or tetraethylsilicate, followed by hydrolysis of the impregnate to form silica. In U.S. Pat. No. 2,493,896 an alumina support material is impregnated with ethylsilicate or a polymer of ethylsilicate, followed by calcination. Multiple impregnations, with calcining after each impregnation, are said to yield a catalyst containing up to 50 wt. % silica. In U.S. Pat. No. 4,172,809 a process for preparing alumina extrudates is disclosed wherein a silicon compound is added to an alumina gel during extrusion of the gel. The resulting extrudate is then calcined. U.S. Pat. No. 2,579,123 discloses reactivating deactivated silica-alumina catalysts by impregnating with a silicon or silicate compound, followed by calcination.

U.S. Pat. No. 3,502,595 discloses the preparation of silica-alumina catalysts by impregnating a hydrated alumina, including boehmite, with one or more organic esters of silicon followed by calcination. U.S. Pat. No. 4,038,337 discloses the preparation of a silica-alumina catalyst by reacting gamma or eta alumina with various esters of orthosilicic acid followed by calcination. U.S. Pat. No. 4,080,284 discloses contacting a support material, such as alumina, with an organic or halogen-substituted silane. The silylated support material is then calcined, followed by steaming at 900°-1600° F.

U.S. Pat. No. 4,013,589 discloses a process for improving the mechanical and thermal properties (stability) of gamma alumina by impregnating the alumina with a hydrolyzable silicone compound and hydrolyzing the impregnate to convert the silicone compound to silica. Temperatures of up to 500° C. are employed for the hydrolyzing step. In one example, a negative comparative example, the alumina was impregnated with a "Ludox" slurry (a solution of colloidal silica) followed by calcination in air at 500° C.

SUMMARY OF THE INVENTION

It has now been discovered that useful cracking catalysts and catalyst supports comprising silica supported on a boehmite like surface can be prepared by compositing particles of silica with particles of porous boehmite and subjecting the composite to high temperature steaming. The composite will be heated at a temperature of at least about 500° C. in a non-reducing environment and in the presence of steam for a time sufficient for at least a portion of the silica to react with the surface of the boehmite. In most embodiments of this invention, the silica will also spread out, wet and disperse over at least a portion of the boehmite surface.

In a preferred embodiment, the boehmite will be porous possessing both external and internal surfaces so that the silica will spread out, wet and disperse over at least a portion of the combined external and interal surface of the porous behmite particles.

As the composite of boehmite, and silica is steamed, the boehmite converts to a transitional alumina phase. At the same time the silica reacts with the surface hydroxyls of the converting boehmite thereby stabilizing or "freezing" the surface of the converting boehmite in a transitional state, while the bulk of the boehmite converts to gamma alumina. This transitional state is a boehmite-like surface phase (hereinafter referred to as a boehmite-like phase) having an amorphous, disordered structure which is different from both boehmite and gamma alumina. Thus the compositions produced by the process of this invention comprise silica supported on a boehmite like surface phase which, in turn, is supported on bulk alumina.

These compositions are different from similar types of compositions formed by (a) compositing particles of silica with particles of alumina and steaming the composite at high temperatures or (b) calcining composites of silica and boehmite.

A number of different compositions comprising silica supported on the surface of a boehmite like surface phase may be prepared employing the process of this invention, some of which are believed to be novel. The resulting composition will be a function of (i) the time, temperature and water content of the steaming treatment; (ii) the relative particle sizes of the silica and boehmite; (iii) the amount of silica employed or composited with the boehmite; (iv) the porosity of the boehmite, and (v) the nature of the silica or silica precursor. The different types of composition which can be prepared employing the process of this invention are set forth below.

(a) A composition comprising discrete islands or areas of silica in a non-crystalline form supported on a boehmite like phase present on the external surface of the alumina which composition exhibits properties substantially different from those of bulk crystalline or non-crystalline silica, boehmite, and alumina.

(b) Discrete particles of silica supported on a boehmite like phase present on the external surface of the alumina which particles exhibit properties of bulk silica, so that the resulting composite exhibits, in part, properties of both bulk crystalline or non-crystalline silica and bulk alumina.

(c) A composition wherein the surface of the (so-formed) alumina is covered completely or in part with silica in a non-crystalline form supported on a boehmite like surface phase on alumina which exhibits properties different from either bulk crystalline or non-crystalline silica, bulk alumina, or silica reacted with a transition alumina phase formed formed calcined boehmite.

(d) Compositions wherein discrete islands or areas of silica exhibiting properties of bulk crystalline or non-crystalline silica are supported on a layer of silica in non-crystalline form which is supported on and reacted with boehmite-like surface phase which, in turn, is supported on the bulk alumina, so that the composite exhibits properties of both bulk crystalline or non-crystalline silica and that of non-crystalline silica supported on a boehmite like surface phase supported on alumina.

Thus, it will be appreciated that the compositions that can be prepared by the process of this invention will range from alumina whose surface is partially covered with and which supports discrete areas or islands of silica in a non-crystalline form supported on a transitional, boehmite like surface phase, so that the composition exhibits properties of both alumina and a non-crystalline silica, to alumina whose surface is partly or completely covered with silica in a non-crystalline form supported on a boehmite-like surface phase, in turn, supported on the alumina, to silica in crystalline or non-crystalline bulk form supported on surface silica in a noncrystalline form supported on a boehmite like surface phase which, in turn, is supported on alumina, so that the composition exhibits the properties of bulk silica and the non-crystalline silica surface phase reacted with the boehmite-like surface phase. Further, the compositions of this invention will generally have considerably higher surface areas than compositions.

The compositions of this invention are useful as cracking catalysts for processes such as gas oil cat cracking, heavy ends cat cracking, resid cat cracking, acid hydrocracking, etc. as well as being useful as catalyst support materials. Further, because the compositions of this invention are resistant to steam under conditions of high temperature, one may, if desired, have steam present in a reaction or cracking zone employing these compositions.

DETAILED DESCRIPTION

Those skilled in the art know that boehmite is a form of hydrated alumina described as aluminum oxide monohydroxide which can be represented by the simple formula A100H. Boehmites also have relatively high surface areas. Commercially available boehmites generally have surface area of about 300–500 $m^2/g$ (BET). These materials are generally relatively porous and, consequently, their measured surface areas include both the exterior surface and the internal pore surface. When boehmite is steamed at temperatures in excess of about 500° C., it undergoes a phase change first to a pseudo-boehmite and then to gamma alumina which results in a reduction of the surface area of from about 300–500 $m^2/g$ to about 200–300 $m^2/g$. If the temperature is greater than 800° C. the formation of $\theta$-$Al_2O_3$ or a mixture of $\theta$-$Al_2O_3$ and $\theta$-$Al_2O_3$ occurs with a concommitant surface area reduction to from about 1–100 $m^2/g$. In marked contrast, in the process of this invention the surface area of the final, silica-containing composition will generally range from about 180–200 $m^2/g$ when the surface area of the starting boehmite material is about 300–500 $m^2/g$. In the process and compositions of this invention, boehmite referes to the bulk structures and is meant to include pseudo-boehmite and mixture of boehmite with pseudo-boehmite.

In the process of this invention, the silica reacts with the surface of the boehmite as it is undergoing phase transition, thereby "freezing" the changing surface in the form of a boehmite-like phase reacted with silica which, in turn, is supported on alumina. The so-formed boehmite-like surface phase has an amorphous, disordered structure unlike either boehmite, pseudo boehmite or alumina. Consequently, even though the bulk boehmite converts to alumina during the high temperature steaming treatment, the surface of the so-formed alumina or, more precisely, those portions of the surface of the so-formed alumina underlying and supporting the silica, will be a boehmite like phase stabilized or "frozen" in that transitional state due to the reaction of the silica with the surface of the boehmite as the boehmite phase changes through a transitional alumina to gamma alumina. It is the formation of this silica-locked, boehmite-like surface phase that prevents the boehmite from desurfacing down to about 100 or even 1 $m^2/g$, which will occur without the presence of the silica in a high temperature steaming environment. As will be shown in the Examples below, the compositions of this invention are different from compositions formed by high temperature steaming a composite of particulate silica and a conventional alumina, such as gamma alumina.

The amount of steam employed in forming the compositions of this invention may vary over a wide range, i.e., from less than about 1% to more than 90% of the non-reducing environment. Compositions of this invention have been made empolying as little as 3% steam to as much as 90% steam. In general, the more steam that is empolyed the faster will be the reaction of the silica with the boehmite surface.

While not wishing to be held to any particular theory, those skilled in the art know that boehmite is a particular form of hydrated alumina which loses water of hydration at elevated temperatures. Boehmite has a relatively large amount of surface hydroxyl groups. It is believed that these surface hydroxyls on the boehmite react with the silica with the formation of oxygen-silicon bonds. Thus, during the process of this invention, the silica reacts with the surface of the transforming boehmite to form a surface phase complex. This surface phase complex is non-crystalline in form and exhibits properties substantially different from either bulk silica, bulk boehmite or the bulk alumina formed from high temperature steaming on the boehmite.

In general, the loading level of the silica wil be such that the amount of silica will range from about 1-50 wt. % of the total composition and more generally from about 1-25 wt. % of the total composition. Preferably the amount of silica will be present in an amount of from about 1 to 20 wt. % of the total composition, more preferably from about 2-10 wt. % and most preferably from about 4-6 wt. %.

As previously stated, boehmites are generally porous materials. That is, there are a multitude of pores and channels from the exterior of a discrete, macroscopic particle to the interior of the particle. Consequently, the surface of a boehmite particle includes all the pores and channels of said boehmite and their surface area as measured by nitrogen gas adsorption according to BET theory. There is much more surface in the interior of such a discrete, macroscopic particle of boehmite than on its exterior surface. In many cases, the external surface is less than 2% of the total surface area. In this application, "surface" is used in such an art-recognized fashion and, unless expressly stated otherwise, is not to be restricted to the physical exterior surface of macroscopic particles to boehmite.

By way of example, Davison Chemical Automotive grade of boehmite has an average particle size, expressed as the diameter, of about 44 microns. The average diameter of the channels or pores after calcining this alumina at 600° C. in air is from about 70-75 Å. The average diameter of the channels or pores of the boehmite are about 40 Å diameter. The average particle size of, for example, collodial silica is about 200 Å. Colloidal silica comprises colloidal size particles of silica in the form of an aqueous slurry. These colloidal silica sols are sold, for example, by DuPont under the trademark LUDOX Thus, if one mixes a colloidal slurry of silica with an aqueous slurry of Davison boehmite with sufficient water present to completely wet the pores of the boehmite, one will obtain, on drying, a composite which one can ideally represent as large spheres of boehmite having holes and channels dispersed there through of a diameter of less than 70-75 Å, with spheres of silica on the external surface of said large particle of boehmite, wherein the silica spheres or hydrated silica spheres have an average diameter of about 200Å. Thus, in this particular type of situation, the particle size of the silica is too large to fit into the pores and channels of the boehmite. Therefore, the silica particles are present on the exterior surface of the boehmite. The amount of silica present can be such that each particle of silica is ideally considerably separated from the next nearest particle of silica or so much silica can be present that the particles of silica completely cover the surface of the boehmite, or even form multilayers on the exterior surface of the boehmite particles. In this composite which is merely dried, but not steamed, the silica has not reacted with the surface hydroxyls of the boehmite in the vicinity of the particles.

One can readily envision that when such a composite is steamed, what will initially happen will be that the silica will react with the surface hydroxyls present on the exterior surface of the boehmite in the vicinity of contact between each particle of silica and the boehmite surface at the same time that the boehmite is phase changing to, for example, $\gamma$-$Al_2O_3$. Thus, one can, under the right conditions of loading and particle size difference, obtain a composite comprising discrete particles of silica a portion of which has reacted with the surface hydroxyls of the boehmite and is bound therefore to the boehmite like phase formed on the exterior surface of the so-formed alumina. Such a composite will exhibit properties of both bulk alumina and bulk crystalline or non-crystalline silica. At this point, if the steaming treatment continues the silica will start to spread out over the surface of the phase-changing, desurfacing boehmite essentially in the form of a monolayer or surface phase complex, including penetration into the internal pores and channels of the alumina. One can envision that in the intial phases of this wetting, dispersing and reacting of the silica with the surface hydroxyls of the boehmite, that one will reach a point where particles of bulk silica rest or are supported on an island of silica on the alumina formed from the boehmite in the form of a surface phase complex such that if the steaming treatment were to be stopped at this point one would have a composition exhibiting the properties of bulk alumina, boehmite or pseudo-boehmite, bulk crystalline or non-crystalline silica and a surface phase silica complex which has properties different from bulk crystalline or non-crystalline silica, boehmite and bulk alumina.

If the steaming treatment is continued, then all of the silica will ultimately spread out, wet and disperse over both the exterior and interior surface of the boehmite. If the initial silica loading is sufficiently low, then one will obtain a composite comprising discrete areas of the surface phase complex silica which has reacted with the boehmite hydroxyls interspersed with areas of alumina which have not been wet by and reacted with the silica due to an insufficient amount of silica on the boehmite when the process started. In such a case, one will have a composite which exhibits properties of both bulk alumina and the surface phase silica-boehmite like complex which has properties different from either bulk alumina or bulk crystalline or non-crystalline silica or bulk boehmite. On the other hand, if the silica loading is sufficient, then one can obtain a composite wherein all of the so-formed alumina surface is covered by and supports the surface phase silica-boehmite complex so that the resulting composite exhibits properties different from bulk crystalline or non-crystalline silica, bulk boehmite and bulk alumina.

By way of example, if the boehmite has a total BET surface area of about 350 $m^2$/g, the amount of silica required to get what one may term to be essentially a saturation monolayer coverage of silica on the ultimately formed alumina support would be about 10 wt. % silica. By 10 wt. % silica is meant that the 10 wt. % silica of the total silica-alumina composite. To carry this progression further, if the silica loading is above that required to achieve saturation monolayer coverage, then it becomes immediately obvious that one will have alumina whose surface is covered with a saturation monolayer surface phase silica-boehmite like, surface complex on an alumina support which, in turn, supports discrete areas of bulk silica. In this case the composite would exhibit properties of the surface phase complex and those of bulk silica at the same time. Finally, to arrive at the final and logical conclusion of the process of this invention, if the initial silica loading is sufficiently high then one will ultimately achieve a composite wherein the silica has completely spread out and wet the surface of the silica but wherein sufficient silica is present that the monolayer silica-boehmite like phase is partially covered by islands or particles of silica.

Thus, one can readily understand from the above discussion, that the final composition will be a function of the many variables set forth under SUMMARY OF THE INVENTION, which includes (i) the time, temperature and steam content of the steaming treatment; (ii) the relative particle sizes of the silica and boehmite; (iii) the silica loading or amount of silica relative to the amount of boehmite employed; (iv) the porosity of the boehmite, and (v) the nature of the silica or silica precursor.

With regard to the relative particle sizes of the silica or silica precursor and the boehmite, the above discussion relating to the use of, for instance, Davison Chemical Automotive Grade boehmite having an average diameter of about 44 microns which corresponds to a mesh size of 325 (Tyler) results in the various compositions that can be made employing the process of this invention. On the other hand, when a reforming grade of boehmite was employed in the process of this invention having a mesh size of 60 (Tyler) which corresponds to an average particle diameter of 250 microns, ESCA analysis found that when this was slurried with silica with sufficient water to wet the pores of the alumina, the silica did not diffuse significantly into the pores of the 60 mesh boehmite material following steam treatment. Thus, even after a 32 hour steam treatment at 870° C. employing 90% steam in $N_2$, the atomic percent of silica as measured by ESCA was only 17. It has been found that this value is similar to that expected for a composition employing boehmite and silica in the form of a collidal silica slurry wherein the silica has been found to be entirely on the exterior surface of the boehmite particle. Thus, this gives rise to the conclusion that the silica surface diffusion or dispersion is relatively sluggish when diffusion or dispersion over significant geometric distances is required. Thus, where it is desired to make relatively large mesh size particles or extrudates employing the process of this invention, the silica particles must be composited with the boehmite before the large particles or extrudates are formed.

In order to confirm the fact that if these relatively large mesh size extrudates when slurried with a colloidal silica slurry and then steamed in order to disperse the silica into the extrudate would not occur, an experiment was performed by preparing an alumina extrudate that was slurried with sufficient colloidal silica slurry to completely coat the extrudate with silica. This material was made and comprised a thin outer coating of silica from the colloidal silica slurry. This thin outer coating was removed by gentle abrasion with a sharp metal blade and then analyzed by ESCA. No silica could be detected by the ESCA on the external surface of this extrudate with the silica coating removed. An identical result would be expected if the extrudite were boehmite instead of aluminia.

In general, boehmite particle sizes of about 80 microns or smaller are suitable for the process of this invention. Compositions made by the process of this invention in the form of larger particles or extrudates may be formed by spray drying, tableting or extruding composites which contain a mixture of the alumina and silica which have not yet been steamed. Once these larger particles are formed, the silica is then dispersed to form a composition by the process of this invention via the high temperature steaming in a non-reducing environment or atmosphere.

It is to be noted that the process of this invention of dispersing the silica onto the surface of boehmite by the high temperature steam treatment in a non-reducing atmosphere will not work with oxides or oxide salt precursors of, for example, titanium, zirconium, hafnium, vanadium, niobium, tantalum and chromium. That is, none of these oxides or will disperse onto the surface of boehmite via the high temperature steam treatment process of this invention.

In the process of this invention, the silica source may be hydrated silica in the form of an aqueous slurry of colloidal silica or very fine particles of silicic acid which is also a form of hydrated silica. Alternatively, if convenient, the silica source may also be in the form of an insoluble silica precursor material such as silicon tetraacetate, silicon oxylate, etc. By insoluble silica precursor material is meant a silicon compound which is insoluble both in water and polar and non-polar solvents ranging from acetone, ethanol, or methanol, ketones, aldehydes, cyclic ketones, hydrocarbons, etc. The important requirement is that the precursor material be one which when subjected to the stream treatment in the non-reducing atmosphere fairly readily converts to silica under the conditions of the streaming treatment.

The invention will be more readily understood by reference to the Examples below:

EXAMPLES

A number of catalysts of this invention were evaluated for gas oil cracking activity in a micro activity test unit (MAT) modified to allow for water (stream) addition along with the feed. The MAT unit is recognized in the industry as a standard diagnostic test unit for cat cracking catalysts (see Ciapetta, F. G. and D. J. Henderson, Oil and Gas J 65 (72), 88, (1967) and Gustofson, W. R., Div. of Pet. Chem, ACS, Preprints 14, B46 (1969).

The oil feed was an East Texas Light Gas Oil having a boiling range of from 450°–700° F. The operating conditions for the test were:

$H_2O$ to Oil mole ratio $=3/1$
Temp. (catalyst) 900° F. (482° C.)
Pressure 1 atmosphere
(WHSV) oil 8hr$^{-1}$ (weight hourly space velocity).

A number of acid catalysts were prepared employing boehmite (A100H) obtained as a 300–425 mesh (Tyler) powder from the American Cyanamid Company as the support and either a colloidal silica slurry or silica acid ($H_2SiO_3$) as the silica. During the preparation of each sample by treatment in stream at high temperature to produce a catalyst (or catalyst support), the boehmite phase converted essentialy to $\gamma$-$Al_2O_3$, (or $\theta$-$Al_2O_3$) and the silica dispersed on the alumina surface to introduce strong acid sites. In the process of steaming these materials, high cracking activity and high surface area were introduced in the final composition. The unexpected activity and high surface area of the catalysts is a result of starting with boehmite and dispersing the silica over the surface. Each sample was steamed at 870° C. in 90 % $H_2O$-10 % $N_2$.

EXAMPLE 1

The preparation of a 6 wt. % $SiO_2$ on alumina sample was carried out by contactiang the boehmite (powder, 325 mesh), A100H (Cyanamid, reforming grade BET surface area to 698 $m^2/g$) with a colloidal $SiO_2$ ("LUDOX" AS-40, DuPont Trade name) in sufficient water to fill the pore volume of the support. To 50 g of Cyanamid A100H, which will decrease to about 40 g weight following a high temperature steaming treatment, was added 6.38 g of the colloidal silica (containing 2.55 g $SiO_2$) in a total aqueous suspension of 37.5 ml. The impregnated sample was dried at 120° C. for 16 hrs., and then steamed at 870° C. for 16 hrs. in 90% $H_2O$-10% $N_2$ in a vertical tube furnace. The BET surface area of this steamed sample was 174 $m^2/g$. This result is set forth in Table 1.

The surface area of an analogously steam-treated alumina, as a reference point, was 115 $m^2/g$. This example demonstrates that steam treatment of a boehmite alumina contacted with colloidal silica retains a very high surface area following a high temperature treatment in a steam rich atmosphere.

EXAMPLE 2

The preparation of a 6.2 wt. % $SiO_2$ on alumina sample was carried by contacting 28.5 g boehmite (powder, 325 mesh), A100H (Cyanamid, reforming grade, BET surface area 698 $m^2/g$) with 1.95 g silica acid, $SiO_2$-$H_2O$ (containing 1.5 g $SiO_2$) and ball-milling the dry sample for 15 minutes. The sample was then steamed at 870° C. for 16 hours in 90% $H_2O$-10% $N_2$ in a vertical tube furnace. The BET surface area of the steam sample was 151 $m^2/g$. This example demonstrates that silicic acid as a precursor serves to retain a quite high surface area following a high temperature treatment in a steam rich atmosphere.

A portion of this steam-treated 6.2wt. % $SiO_2$ on alumina material was used to establish the catalytic cracking activity. The catalytic cracking activity tests were performed on a modified MAT unit described in the Experimental Section. The MAT activity (volume percent conversion to 400- liquids) was 22 with a conversion to liquids of 5.4 wt. % based on feed. These results are listed in Table 1. This example will be useful for comparison to other examples of instant invention.

A second portion of the 6.2 wt. of $SiO_2$ on alumina sample following the ball-milling step was steamed at 760° C. for 1 hr. in 90% $H_2O$-10% $N_2$ in a vertical tube furnace. The MAT activity of this sample was 21 with a conversion to liquids of 1.8 wt. % based on feed. This example shows that a steam treatment of 760° C. for 1 hr. produces a less effective 6% $SiO_2$ on alumina solid acid catalyst than a steaming treatment of 870° C. for 16 hrs. For reference purposes, the MAT activity of $\gamma$-$Al_2O_3$ steam-treated at 870° C. for 16 hrs. in 90% $H_2O$-10% $N_2$ was 17 with a conversion to liquids of 1.8 wt. % based on feed.

EXAMPLE 3

The preparation of a 12 wt. % $SiO_2$ on alumina sample was carried out as described in Example 1. To 27g of Cyanamid A100H was added 7.5 g of colloidal silica sold under the trademark LUDOX AS-40 (containing 3.0 g $SiO_2$) in a total aqueous suspension of 18 ml. The impregnated sample was dried at 120° C. for 16 hrs., and then steamed at 870° C. for 1 hr. in 90% $H_2O$-10% $N_2$ in a vertical tube furnace. The BET surface area of this steamed sample was 214 $m^2/g$. This example further serves to demonstrate that steam treatment of a boehmite alumina contacted with colloidal silica retains a very high surface area for a high temperature treatment in a steam rich atmosphere.

A portion of this steam-treated 12 wt. % $SiO_2$ on alumina material was used to establish the catalytic cracking activity as described in Example 2. The MAT activity was 28 with a conversion to liquids of 9.5 wt. % based on feed. These results are set forth in Table 1.

This sample has both a higher MAT activity and a higher conversion to liquid products than the 6 wt. % $SiO_2$ on alumina samples of Example 2. This example demonstrates that quite active cracking catalysts can be prepared by contacting colloidal $SiO_2$ with a boehmite alumina followed by a one hour steaming treatment at 870° C.

EXAMPLE 4

By was of comparison, ten and 15 wt. % $SiO_2$ on alumina samples were prepared on a reforming grade gamma-alumina according to the procedure described in Example 3. Both samples were steamed at 870° C. for 1 hr. in 90% $H_2O$-10% $N_2$ in a vertical tube furnace. The BET surface areas of these samples were 157 and 153 $m^2/g$, respectively. Therefore, it is clear that the 12% $SiO_2$on alumina sample prepared employing A100H as the starting phase has a higher surface (214 $m^2/g$) than either of the samples prepared on gamma-alumina by the procedure of the instant invention.

EXAMPLE 5

In order to demonstrate the unique stability of the $SiO_2$ on alumina catalysts prepared using boehmite as the precursor alumina the surface area stability of different samples was investigated after impregnation of 3 wt. % V (as the metal). For example, to 14.92 g Cyanamid boehmite described in Example 1 was added 1.44 g $VO(OC_3H_7)_3$ (containing 0.3 g V) in 12 ml methanol by the incipient wetness impregnation technique. The sample was dried for 16 hrs. at 120° C. and heated for 1 hr. at 500° C. for 16 hrs. in air. The final sample weight was 10.1 g so the vanadium loading was 3 wt. %. The sample was then calcined at 890° C. for 16 hrs. in air. The BET surface area of the calcined catalyst was 5 $m^2/g$.

EXAMPLE 6

A portion of the 6% $SiO_2$ on alumina sample of Example 1 was impregnated with $VO(OC_3H_5)_3$ as described for the A100H sample of this example. Following an analogous drying and calcination procedure as for the 3 wt. % V on boehmite the BET surface area was 57 $m^2/g$ following calcination at 890° C. for 16 hrs. in air. This example serves to demonstrate the unique surface area stability of $SiO_2$ on alumina catalysts of the instant invention.

EXAMPLE 7

The 12 wt. % $SiO_2$ on alumina sample of 214 $m^2/g$ surface area of Example 3 was impregnated with 3 wt. % V as described in Example 5. The sample was then steam-treated at 927° C. for 16 hrs. in 90% $H_2O$-10%

$N_2$ in a vertical tube furnace. The BET surface area of this sample was 121 m$^2$/g. This example serves to demonstrate the unique stability of SiO$_2$ on alumina materials prepared by the procedure of the instant invention.

Finally, two samples of SiO$_2$ on boehmite were prepared containing 3.5 and 6 wt. % SiO$_2$. These two samples were then impregnated with 3% V as described in this. Each sample was then steamed at 927° C. for sixteen hours. The results are set forth in Table 2.

TABLE 1

SiO$_2$ on A100H Prepared from "Ludox" and Silicic Acid

| Sample No. | Sample | Activation Treatment | Area (m$^2$/g) | MAT No. | % Selectivity 400 |
|---|---|---|---|---|---|
| 1 | 6% SiO$_2$ on A100H (Cyanamid) | Stm 870° C., 16 hrs | 174 | — | — |
| 2 | 6% SiO$_2$ on A100H (Cyanamid) | Stm 870° C., 16 hrs | 151 | 22 | 5.4 |
| 3 | 12% SiO$_2$ on A100H (Cyanamid) | Stm 870° C., 1 hr | 214 | 28 | 9.5 |

TABLE 2
VANADIUM DATA

| Example No. | | | |
|---|---|---|---|
| 5 | 3% V/A100H Cyan. | Calcined 890° C. | Surface Area 5 m$^2$/g |
| 6 | 3% V/6% SiO$_2$/A100H (Sample 1 Table 1) | Calcined 890° C. | Surface Area 57 m$^2$/g |
| 7 | 3% V/12% SiO$_2$/A100H Cyan. (Sample 4 Table 1) | Steamed 927° C. | Surface Area 121 m$^2$/g |
| 8 | 3% V/$\gamma$-Al$_2$O$_3$ | Steamed 927° C. | Surface Area 3 m$^2$/g |
| 8 | 3% V/25% SiO$_2$/$\gamma$-Al$_2$O$_3$ (Sample 6, Table 1B) | Steamed 927° C. | Surface Area 30 m$^2$/g |
| 8 | 3% V/3.5% SiO$_2$/A100H | Steamed 927° C. | Surface Area 99 m$^2$/g |
| 8 | 3% V/6% SiO$_2$/A100H | Steamed 927° C. | Surface Area 118 m$^2$/g |
| 8 | 3% V/10% SiO$_2$/$\gamma$Al$_2$O$_3$ | Steamed 927° C. | Surface Area 18 m$^2$/g |
| 8 | 3% V/2% SiO$_2$—Al$_2$O$_3$ (cogel) | Steamed 927° C. | Surface Area 10 m$^2$/g |

EXAMPLE 8

A 3 wt. % V on $\gamma$-Al$_2$O$_3$ sample was prepared as described in Example 5. The sample was steam-treated at 927° C. for 16 hrs. in 90% H$_2$O–10% N$_2$ in a vertical tube furnace. The BET surface area of this sample was 3 m$^2$/g. A 25 wt. % SiO$_2$ on gamma-alumina sample was prepared as described in Example 1. To a portion of this sample 3 wt. % V was added as described in Example 4. Following a steam-treatment at 927° C. for 16 hrs. in 90% H$_2$O–10% N$_2$ in a vertical tube furnace the BET surface area was found to be 30 m$_2$/g.

As commercial silica-alumina containing 10 wt. % SiO$_2$ and prepared by a co-gelation procedure was impregnated with 3 wt. % V as described in this Example. Following a steaming treatment as described in this Example at 927° C. the sample had completely converted to $\gamma$-Al$_2$O$_3$ as determined by x-ray diffraction. A 2 wt. % SiO$_2$ content silica-alumina co-gel was prepared by precipitation of the metal alkoxides by well-known precipitation procedures. The 2% SiO$_2$ content sample was calcined at 500° C. and impregnated with 3 wt. % V as described in this Example. Following a steaming treatment as described in this Example, the BET surface area was found to be 10 m$^2$/g. These samples demonstrate that stability to vanadium in high temperature steam environments is completely unique to the silica on alumina catalysts prepared using boehmite as the precursor alumina source of this instant invention.

What is claimed is:

1. A process for preparing a composition comprising silica supported on alumina which comprises forming a composite of particles of silica or silica precursor and boehmite and heating said composite at a temperature of at least about 500° C. in a non-reducing environment and in the presence of steam for a time sufficient for (i) at least a portion of the silica to react with the surface of the boehmite to form an amorphous, disordered phase which is an intermediate of boehmite and gamma alumina and (ii) at least a portion of the boehmite to convert to gamma alumina.

2. The process of claim 1 wherein said boehmite is porous.

3. The process of claim 2 wherein at least a portion of the silica or silica precursor spreads out, wets and reacts with at least a portion of the surface of the boehmite.

4. The process of claim 3 wherein at least a portion of the silica disperses over the surface of the boehmite.

5. Composition comprising silica and gamma alumina wherein an amorphous, disordered alumina phase is supported on the external surface of the gamma alumina, and wherein said silica is supported on said amorphous, disordered phase.

6. The composition of claim 5 wherein said silica consists essentially of discrete particles.

7. The composition of claim 5 wherein said silica consists essentially of non-crystalline silica supported in discrete areas on said amorphous, disordered phase.

* * * * *